April 10, 1945.   W. W. LEWIS   2,373,578
DIVIDING HEAD
Filed Feb. 8, 1944   2 Sheets-Sheet 1

W. W. Lewis
INVENTOR.
By C. A. Snow & Co.
ATTORNEYS.

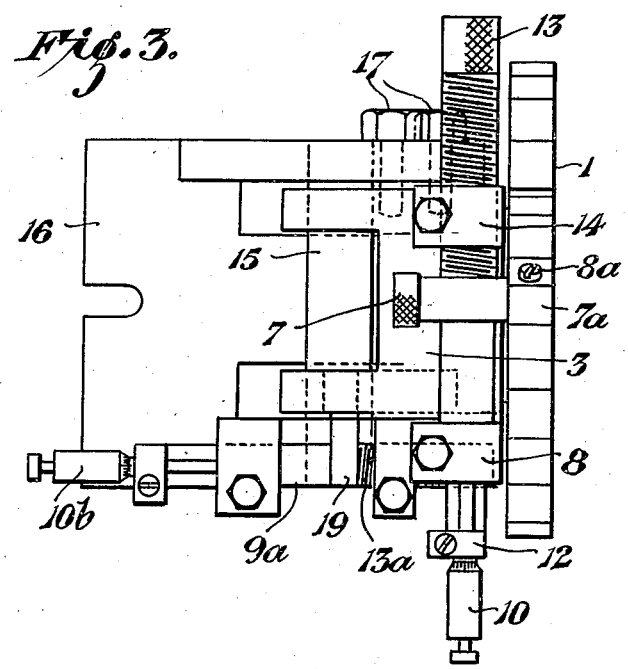
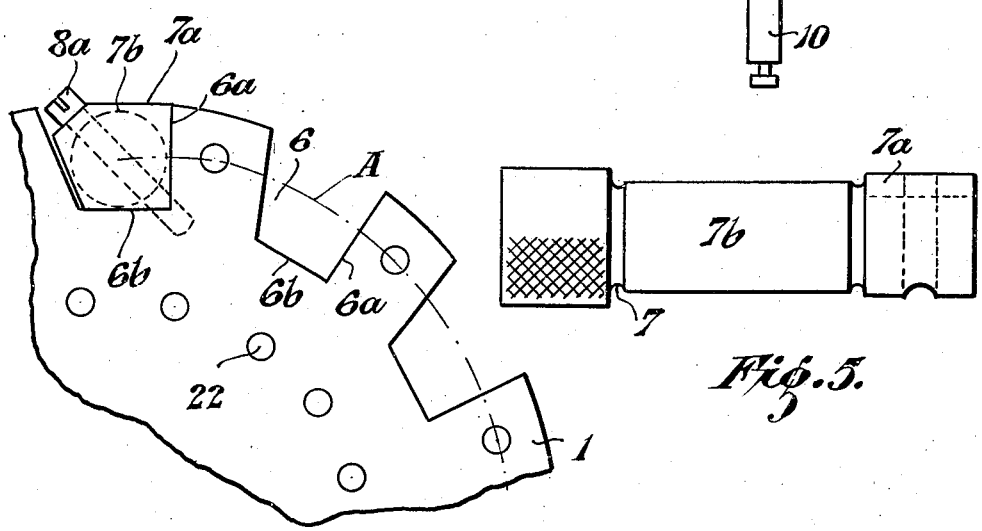

UNITED STATES PATENT OFFICE 2,373,578

DIVIDING HEAD

Walter William Lewis, Birmingham, England

Application February 8, 1944, Serial No. 521,542
In Great Britain February 16, 1943

8 Claims. (Cl. 90—57)

This invention relates to dividing heads, and it has for its object a dividing head which is simple in construction and which enables angular settings to be quickly obtained with great accuracy. By this invention also the work-piece can be carried on the dividing head whilst being shaped or machined.

According to the present invention, an angularly adjustable index member is set in any desired angular position by means of a measuring device having linear adjustment based on a trigonometric ratio with the required angular adjustment. Thus the linear adjustment may be the sine of the angular adjustment. The index plate or member may be divided into predetermined angular divisions so that the plate may be turned any number of such divisions and an intermediate angular setting obtained by the measuring device having linear adjustment. An abutment pin or member may be fixed at any angular division on the same pitch circle and the pin or member is moved with the index plate against the linear measuring device which may be set by a micrometer head or the measuring device may comprise slip gauges.

In order that the invention may be clearly understood and readily carried into effect, reference may be had to the accompanying drawings on which—

Figure 3 is a plan view.

Figure 4 is a view of a portion of the index plate and

Figure 5 is a side elevation of the stop pin detached from the index plate.

Figure 1:
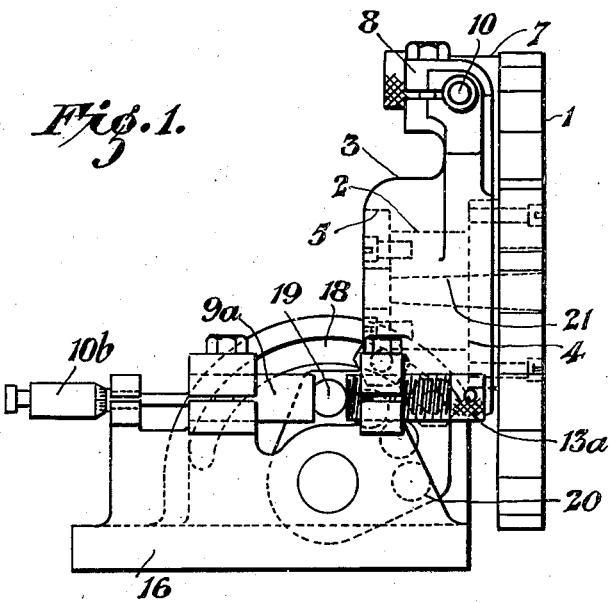
Figure 1 is a side elevation of a dividing head.
Figure 2:
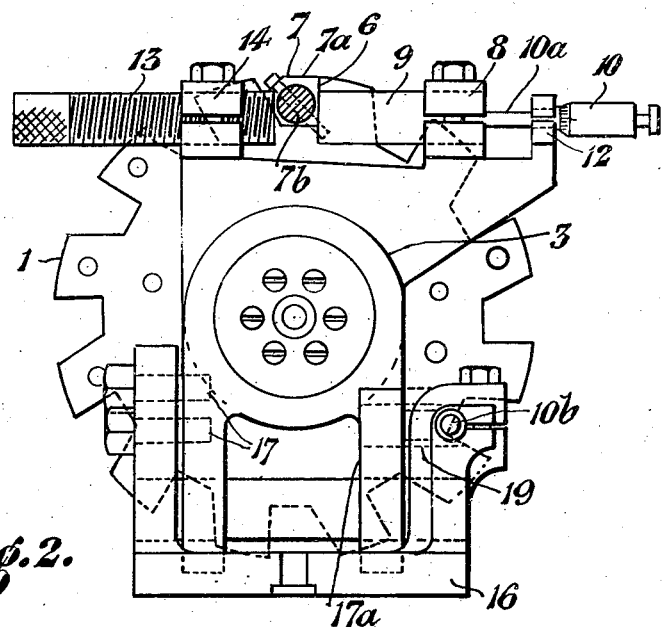
Figure 2 is a back view, the stop pin on the index plate being shown in section.

According to a convenient embodiment of the present invention, an index plate or work holder 1 is fixed on a spindle 2 rotatably mounted in a casting forming the index body or frame 3. The index plate 1 is fixed against a collar 4 on the spindle 2 by set screws and the spindle is journaled in the body 3 by means of a thrust plate 5 fixed to the outer end of the spindle 2 and bearing against a shoulder on the index body or frame 3. The index plate or disc 1 has twelve notches 6 therein spaced 30 degrees apart and on the same pitch circle. An abutment pin 7 is adapted to be fixed in any notch 6 which have two faces 6a and 6b at right angles to one another and the head 7a of the stop pin has two faces at right angles to one another for fitting against the two faces 6a and 6b and the head is fixed in this position by the screwed pin 8 engaging a tapped hole in the index plate. By thus fitting the parts together the axis of the cylindrical body portion 7b can be easily arranged to have its axis in the pitch circle A and at 30 degrees apart by the fitter adjusting the said flat faces. The index body 3 at the upper end has a split clamping lug 8 for receiving and holding a setting shaft 9 in a direction tangential to said pitch circle A and the end flat face of this shaft 9 is adapted to bear against the cylindrical body 7b of the abutment plug 7. The shaft 9 is of a predetermined length and is set by means of a micrometer head 10 arranged in a split clamp 12 in alignment with the said setting shaft. A number of setting shafts of different lengths are provided so that any one can be used according to the setting required and keep within range of the micrometer adjustment. A locking shaft 13 is also mounted in a split clamping lug 14 on the index body 3 in alignment with the said setting shaft 9 and is adapted to the screwed up to the plug pin 7 and then clamped in the split clip. Thus work fixed to the index plate can be machined. To obtain any setting greater than 30 degrees, the index plate is rotated 30 degrees or a plurality of 30 degrees and the stop pin 7 placed in the appropriate notch in the index plate 1 to project axially at right angles from the face of the plate. The stop pin 7 is now positioned in a notch and the axis lies in a plane passing through the axis of the index plate and at right angles to the axis of the setting shaft 9. The index plate 1 can be turned through 30 degrees and in all positions the end of the setting shaft can bear against the cylindrical portion of the stop pin 7. In this position, the micrometer spindle 10a bears against the setting shaft and the micrometer is at zero. Therefore when the index plate is turned and the stop 7 is fixed in a notch the angular movement of the index plate will be 30 degrees or a multiple thereof. To further adjust the index plate through an angle less than 30 degrees, the sine of the angle is obtained and the setting shaft is set at a distance from its position when bearing against the plug pin in the aforementioned position a distance equal to the sine, multiplied by the radius of the pitch circle. Taking the radius of the said pitch circle as the hypotenuse of the triangle, this triangle is formed by a line at right angles to the axis of the setting shaft and passing through the centre of the shaft on which the index plate is mounted, a line at right angles to this aforementioned line, passing through the centre of the stop pin, and a line connecting the centre of the aforementioned shaft 2 and stop pin; the apexes of the triangle being the intersection points of these lines. The index disc 1 is now turned to the position with the stop pin bearing against the setting shaft. For repeat operations the setting shaft and micrometer head, are locked in the set positions. The index disc can thus be quickly set at any angle, as the datum position for taking linear adjustment is known.

The index body or frame 3 may be mounted on a fulcrum shaft 15 carried by a base frame 16 and angular adjustments can be made similarly as aforedescribed. Holes 20 for the stop pin 19 are provided in the flange 17a of the index body 3 which lies at right angles to the index disc 1 and the setting shaft 9. A micrometer head 10b and locking shaft 13a are mounted on the base frame 16. The index body is locked in the set position such as by means of pins 17 thereon engaging a curved slot 18 in the base frame and receiving locking nuts. By suitably designing the frame parts any desired number of angular settings can be obtained. The stop pin 19 may be of modified construction so that it is cylindrical where it is fitted in holes 20 and has a flat on the portion of the pin projecting from the hole and engaging against the flat end of the setting shaft 9a. The stop pins 19 may however be similar to the stop pins 7.

The spindle carrying the index disc may have a Morse taper hole 21 for receiving a shaft or poppet centre for carrying the "work" and the face of the index plate may have holes 22 for fixing fastening dogs thereto, or be otherwise adapted for securing the work thereto.

In a further form, in lieu of having micrometer adjustment, the setting shaft 9 may be adapted to be set against slip gauges or other linear measuring means and the gauges may be supported on a flat face on a lug such as 12 of the frame 3 carrying the index plate 1 or angularly adjustable member.

The means for obtaining angular settings incorporating linear adjustment means may be incorporated in any machine or apparatus.

The aforedescribed means for obtaining angular settings is extremely simple and enables accurate production methods to be utilised, whereby great accuracy of adjustment can be obtained by comparatively inexpensive means.

I claim:

1. A dividing head comprising a frame member, an index plate or work carrier rotatably mounted on the frame, a stop member detachably positioned on the index plate at any one of a number of predetermined angular intervals, an adjustable stop member mounted on the said frame and adapted to measure by a linear adjustment from a predetermined position of the stop member on the index plate set in a predetermined position, which adjustment is based on a trigonometric ratio of the required angular adjustment and which adjustable stop member forms a stop against which the stop member on the index plate moves to limit the movement of the index plate through the required angle.

2. A dividing head comprising a frame member, an index plate or work carrier rotatably mounted thereon, a stop member projecting from the face of the index plate and adapted to be positioned on the same pitch circle at any one of a number of predetermined angular intervals, an adjustable stop mounted on the said frame and adjustable in a line tangential to said pitch circle, and adapted to measure a linear distance from a line at right angles to the said tangential line and passing through the axis of the index plate which linear distance is determined by the sine of the angle through which the index plate is to be turned, the adjustable stop forming a stop against which the stop on the index plate abuts in the adjusted position of the index plate.

3. A dividing head comprising a frame member, an index plate or work carrier rotatably mounted thereon, a stop member projecting from the face of the index plate and adapted to be positioned on the same pitch circle at any one of a number of predetermined angular intervals, an adjustable stop mounted on the said frame and adjustable in a line tangential to such pitch circle or a line parallel to such line and adapted to measure a linear distance from a line at right angles to the said tangential line and passing through the axis of the index plate which linear distance is determined by the sine of the angle through which the index plate is to be turned, the adjustable stop forming a stop against which the stop on the index plate abuts and a clamping member mounted on the said frame for clamping the stop on the index plate against the adjustable stop to rigidly hold the index plate in the adjusted position.

4. A dividing head comprising a frame member, an index plate or member rotatably mounted on the frame, a stop member detachably positioned on the index plate at any one of a number of predetermined angular intervals, an adjustable stop member mounted on the said frame and adapted to measure by a linear adjustment from a predetermined position of the stop member on the index plate set in a predetermined position, which adjustment is based on a trigonometric ratio of the required angular adjustment, and which adjustable stop member forms a stop against which the stop member on the index plate moves to limit the movement of the index plate through the required angle and a clamping member mounted on the said frame for clamping the stop on the index plate against the adjustable stop to rigidly hold the index plate in the adjusted position.

5. A dividing head comprising a frame member, an index plate or work carrier rotatably mounted on the frame, a stop member projecting from the face of the index plate parallel to the axis of rotation and adapted to be detachably positioned on the same pitch circle on the index plate at any one of a number of predetermined angular intervals, such stop member comprising a cylindrical pin having a head with two angularly disposed faces which are clamped against correspondingly disposed faces on the index plate, an adjustable stop mounted on the said frame and adjustable in a line tangential to said pitch circle, and adapted to measure a linear distance from a line at right angles to the said tangential line and passing through the axis of the index plate which linear distance is determined by the sine of the angle through which the index plate is to be turned, the adjustable stop forming a stop against which the stop on the index plate abuts.

6. A dividing head comprising a frame member, an index plate or work holder rotatably mounted on the frame, a stop member projecting from the face of the index plate and adapted to be detachably positioned on the index plate at any one of a number of predetermined angular intervals on the same pitch circle, an adjustable stop comprising a setting shaft slidably mounted in a clamp on the said frame and adjustable in a line tangential to the said pitch circle and adapted to be set and clamped at a linear distance from a line at right angles to the said tangential line and passing through the axis of rotation of the index plate which linear distance is determined by the sine of the angle through which the index plate is to be turned, micrometer measuring means for setting the setting shaft, such adjustable stop forming a stop against which the stop on the index plate abuts when the index plate is turned to the adjusted position and means for clamping the stop on the index plate against the adjustable stop.

7. A dividing head comprising a frame member, an index plate or work holder rotatably mounted thereon, a stop member projecting from the face of the index plate and adapted to be positioned at any one of a number of predetermined angular intervals on the same pitch circle, an adjustable stop mounted on the said frame and adjustable in a line tangential to such pitch circle, and adapted to measure a linear distance from a line at right angles to the said tangential line and passing through the axis of the index plate which distance is determined by the sine of the angle through which the index plate is to be turned, the adjustable stop forming a stop against which the stop on the index plate abuts, means for clamping the said stops together for holding the index plate in the adjusted position, a second frame member on which the first mentioned frame member is adjustably pivoted, and means for setting and fixing the first mentioned frame member in the adjusted position.

8. A dividing head comprising a frame member, an index plate or work carrier rotatably mounted thereon, a stop member projecting from the face of the index plate and adapted to be positioned at any one of a number of predetermined angular intervals on the same pitch circle, an adjustable stop mounted on the said frame and adjustable in a line tangential to such pitch circle, and adapted to measure a linear distance from a line at right angles to the said tangential line and passing through the axis of the index plate or work carrier determined by the since of the angle through which the index plate is to be turned, the adjustable stop forming a stop against which the stop on the index plate abuts, and clamping means fixing the stop on the index plate against the adjustable stop comprising a screwed clamping pin which screws up against the stop on the index plate or work carrier.

WALTER WILLIAM LEWIS.